US007700936B2

(12) United States Patent
Murakowski et al.

(10) Patent No.: US 7,700,936 B2
(45) Date of Patent: Apr. 20, 2010

(54) FABRICATION OF QUANTUM DOTS EMBEDDED IN THREE-DIMENSIONAL PHOTONIC CRYSTAL LATTICE

(75) Inventors: Janusz Murakowski, Newark, DE (US); Garrett Schneider, New Castle, DE (US); Dennis W. Prather, Newark, DE (US)

(73) Assignee: University of Delaware, Wilmington, DE (US)

( * ) Notice: Subject to any disclaimer, the term of this patent is extended or adjusted under 35 U.S.C. 154(b) by 487 days.

(21) Appl. No.: 11/427,832

(22) Filed: Jun. 30, 2006

(65) Prior Publication Data

US 2007/0001161 A1 Jan. 4, 2007

Related U.S. Application Data

(60) Provisional application No. 60/696,245, filed on Jul. 1, 2005.

(51) Int. Cl.
*H01L 27/15* (2006.01)

(52) U.S. Cl. ............ 257/9; 257/E29.072; 257/E29.073; 257/E29.074; 257/E29.075; 257/E29.076; 257/E29.077; 257/E29.078; 257/E29.079; 257/E29.08; 257/E29.081; 257/E29.082; 257/E29.083; 257/E29.084; 257/E29.071; 257/E33.001; 257/E33.002; 257/E33.003; 257/E33.004; 257/E33.005; 257/E33.011; 257/E33.012; 257/E33.013; 257/E33.014; 257/E33.015; 257/E33.006; 257/E33.007; 257/E33.008; 257/E33.009; 257/E33.01; 257/E33.016; 257/E33.017; 257/E33.018; 977/774; 977/814; 977/778; 372/39; 372/43.01; 372/50.1; 372/50.11; 385/2; 385/8; 385/10; 385/15; 385/37; 385/129; 385/130; 385/131; 385/132; 257/79; 257/103; 257/14; 428/304.4; 428/312.6

(58) Field of Classification Search ...............................
257/E29.071–E29.084, E33.001–E33.018,
257/79, 103, 9, 14; 977/774, 778, 814; 428/304.4,
428/312.6; 372/39, 43.01, 50.1, 50.11; 385/2,
385/8, 10, 15, 37, 129–132
See application file for complete search history.

(56) References Cited

U.S. PATENT DOCUMENTS

| | | | | |
|---|---|---|---|---|
| 5,354,707 A * | 10/1994 | Chapple-Sokol et al. | ...... | 438/24 |
| 6,011,271 A * | 1/2000 | Sakuma et al. | ................ | 257/14 |
| 6,711,200 B1 * | 3/2004 | Scherer et al. | ................ | 372/64 |
| 6,734,453 B2 * | 5/2004 | Atanackovic et al. | ......... | 257/19 |
| 6,804,283 B2 * | 10/2004 | Scherer | ................... | 372/50.21 |
| 6,988,058 B1 * | 1/2006 | Sherwin et al. | ................ | 703/1 |
| 7,151,883 B2 * | 12/2006 | Chen et al. | ................... | 385/147 |
| 7,346,251 B2 * | 3/2008 | Bose et al. | ................... | 385/129 |
| 2002/0167984 A1 * | 11/2002 | Scherer | ....................... | 372/50 |
| 2004/0075464 A1 * | 4/2004 | Samuelson et al. | ............ | 326/37 |
| 2004/0091010 A1 * | 5/2004 | Choquette et al. | ............. | 372/44 |

(Continued)

*Primary Examiner*—Wael Fahmy
*Assistant Examiner*—Hrayr A Sayadian
(74) *Attorney, Agent, or Firm*—RatnerPrestia (57) ABSTRACT

In one embodiment, a method of producing an optoelectronic nanostructure includes preparing a substrate; providing a quantum well layer on the substrate; etching a volume of the substrate to produce a photonic crystal. The quantum dots are produced at multiple intersections of the quantum well layer within the photonic crystal. Multiple quantum well layers may also be provided so as to form multiple vertically aligned quantum dots. In another embodiment, an optoelectronic nanostructure includes a photonic crystal having a plurality of voids and interconnecting veins; a plurality of quantum dots arranged between the plurality of voids, wherein an electrical connection is provided to one or more of the plurality of quantum dots through an associated interconnecting vein.

26 Claims, 8 Drawing Sheets

(b)

Quantum dots

U.S. PATENT DOCUMENTS

| | | | |
|---|---|---|---|
| 2005/0070113 A1* | 3/2005 | Hanberg | 438/706 |
| 2005/0271092 A1* | 12/2005 | Ledentsov et al. | 372/20 |
| 2006/0029349 A1* | 2/2006 | Hoshi et al. | 385/129 |
| 2006/0263025 A1* | 11/2006 | Sugita et al. | 385/129 |
| 2007/0025673 A1* | 2/2007 | Bose et al. | 385/129 |
| 2008/0315177 A1* | 12/2008 | Bose et al. | 257/13 |

* cited by examiner

(1) Prepare substrate

(2) Grow quantum well (3) Etch 3D photonic crystal

Quantum dots

FIG. 4

Photonic crystal lattice patterned in PMMA a

Isotropic Etch.

b

Passivation layer deposition. $C_4F_8$ c

Anisotropic Etch, removal of polymer at the trench d

Isotropic Etch.

e

The etch profile after several repetitions of the above steps f

Time multiplexed DRIE process for slab PhC fabrication.

FABRICATION OF QUANTUM DOTS EMBEDDED IN THREE-DIMENSIONAL PHOTONIC CRYSTAL LATTICE

CROSS-REFERENCE TO RELATED APPLICATIONS

This application claims benefit under 35 U.S.C. §119(e) to U.S. Provisional Application 60/696,245 filed on Jul. 1, 2005, the entire contents of which are incorporated herein by reference.

BACKGROUND

This application is related to processes suitable for producing nanostructures in the form of quantum dots ("QD-s") in silicon (Si). This disclosure is more particularly related to a new process for fabricating nanostructures in the form of QD-s in epitaxially grown silicon.

Quantum dots form when very thin semiconductor films buckle due to the stress of having lattice structures slightly different in size from those of the material upon which the films are grown.

The small size of QD-s results in new quantum phenomena that yield desirable effects. Material properties change dramatically because quantum effects arise from the confinement of electrons and holes in the material. The small size changes other material properties such as the electrical and nonlinear optical properties of a material, making them very different from those of the material's bulk form. Hence, these very small, semiconducting quantum dots provide gateways to an large array of possible applications and new technologies.

Light emission in bulk silicon presents a challenge because Si is an indirect bandgap material, therefore radiative transition requires phonon assistance, and therefore the transition has low probability so that non-radiative processes dominate. A phonon is a quantized mode of vibration occurring in a rigid crystal lattice, such as the atomic lattice of a solid.

Having quantum dots allows overcoming these difficulties by broadening the electron and hole wave functions in momentum space, thereby increasing their overlap in the Brillouin zone, thus allowing direct radiative recombination, and increasing radiative process probability. The Brillouin zone is a property of a crystal whose geometrical shape can be considered to contain the valence electrons of the crystal. Its planes define the location of the band gap in momentum space (k-space).

Difficulties with QD-s previously realized include the fact that QD-s were embedded in an $SiO_2$ matrix, which provides poor conductivity for electrical pumping. Reducing QD separation to improve conductivity (e.g., by tunneling) compromises the dot isolation required for electron/hole quantum confinement, and therefore compromises optical performance. Similar problems with charge transport are encountered in the case of micro-porous Si. In addition, a very thin layer of $SiO_2$ with embedded QD-s is required to maintain low threshold voltage for luminescence, however, having a thin layer means few dots and thus low brightness. Careful passivation of QD surfaces is required to improve stability, but this impairs electron transport (for pumping). Lowering the resistance of the matrix material to improve conductivity appears to lead to the current bypassing QD-s, resulting in compromised pumping efficiency. Further, variation in QD size contributes to line broadening, and further processing is required to place QD-s in an optical cavity as would be required for producing a laser.

What is needed is a process for producing quantum dots which overcomes the above-mentioned problems, and which may be implemented using conventional semiconductor processing techniques.

SUMMARY

The method of this disclosure allows the use of CMOS-compatible processes to produce quantum dots embedded in 3photonic crystal, and where the QD-s are lithographically defined and, therefore, deterministically placed in the desired locations.

The QD-s produced by the method are electrically connected (e.g., through silicon veins) to a bulk silicon substrate and to the top surface of patterned silicon. In the case of a laser, for example, the top electrode(e.g., metal) is optically isolated from the structure producing light by the intervening photonic crystal allowing for optical isolation of the optical mode from the metal, and thereby minimizing optical losses.

By having the electrical connections going only through the QD-s without the ability to bypass them, pumping efficiency is improved by using all the current as an injection current. The QD-s are optically isolated from the substrate by the photonic crystal ("PhC"). Therefore, if light is produced in the QD-s by means of electrical pumping, this light does not leak to the substrate, thus improving the efficiency of light generation in the structure.

Further, the QD-s are passivated as part of the fabrication process, thus making the quantum dots more stable, and with uniform size since the QD-s are defined by epitaxial growth and lithography, both of which are capable of high precision and high density fabrication of isolated QD-s.

BRIEF DESCRIPTION OF THE DRAWINGS

FIG. 2(a) illustrates a 3D photonic crystal etched in substrate with quantum wells, FIG. 2(b) shows a plane through the photonic crystal; FIG. 2(c) illustrates a portion of the PhC structure below the plane in FIG. 2(b), and FIG. 2(d) illustrates a perspective view where quantum dots appear in veins between voids where quantum well layers were grown, and where the arrows in FIGS. 2(c) and (d) point to locations of some of the quantum dots;

FIG. 6(a) shows a scanning electron microscope (SEM) picture of a high-fill-factor (r/a>0.4) PhC lattice patterned in PMMA using high-resolution e-beam lithography, while FIG. 6(b) provides a zoom-in view of the etched slab PhC device;

FIG. 7(a) depicts a process sequence schematic for a modified TM-DRIE process that would yield buried 3D PhCs, and which is applicable to producing PhCs containing quantum dots, and FIG. 7(b) provides a depiction showing a square lattice etch mask leading to fabrication of 3D simple cubic PhCs.

DETAILED DESCRIPTION

This disclosure provides a fabrication method that allows deterministic and easy placement of QD-s inside a 3-D photonic crystal lattice to be achieved, and which provides a path for electrical pumping of QD-s. Further, leak current bypassing QD-s is suppressed, and metal electrodes are optically isolated from, but electrically connected with QD-s. In addition, QD-s are passivated as part of the fabrication process, thus improving the stability of the devices. Homogeneous QD size and high density of isolated QD-s are possible.

The method and structure of this disclosure overcome the difficulties of conventional approaches. Photonic crystal structures provide natural pathways for current, thereby allowing convenient electrical pumping. The conductivity can be selectively enhanced by doping during crystal growth, e.g., during epitaxial growth. All pumping current necessarily passes through quantum dots, resulting in efficient pumping. The pumping electrodes are optically isolated from the laser mode, resulting in low optical loss in metal electrodes. Further, all surfaces of the photonic crystal, and therefore all surfaces of the quantum dots, are passivated as part of the PhC fabrication process, thereby allowing improved stability of the device.

Homogeneous QD size is possible as QD-s may be defined epitaxially as well as lithographically. Several layers of quantum wells grown during epitaxy will result in several layers of QD-s, thereby increasing brightness of the laser; separation between layers of QD-s is controlled during epitaxial growth, which allows for maintaining the quantum confinement of electrons and holes. Further, quantum dots are naturally embedded inside a 3D photonic crystal which provides an optical cavity by distributed Bragg reflection in all directions to enable efficient lasing.

The quantum well layer may consist of more than one quantum well. In the case where more than one quantum layer is grown, vertically aligned quantum dots emerge following the etching step. The vertical alignment in this case does not necessarily imply interaction between the dots as is typically the case in conventionally grown quantum dot layers.

Also, the quantum well layer can be replaced by a quantum dot layer grown epitaxially. In this case, the etch step isolates the quantum dots into small groups, perhaps as small as one dot in a group, which are isolated from one another and can be electrically pumped through silicon veins remaining after the etch step.

Further, the electrically pumped quantum dots can be the source of photons extracted from the device, or can serve to pump other structures/atoms. For example, silicon dioxide that is formed on the inside surfaces of the photonic crystal during the passivation step of the fabrication process can be doped with erbium or other rare-earth material. In this case, the decaying exciton formed during electrical pumping in the quantum dot could pump erbium atoms and yield population inversion as required for realizing a laser.

The resulting nanostructure device can serve as a light source, including a laser light source. This can be either a stand-alone source, or, more interestingly, a source integrated with supporting electronic circuitry. Since this source is made in silicon it makes monolithic integration of electronic circuits possible based on silicon. Having light source integrated with CMOS electronics opens up a range of applications, which include, for example, on-chip optical communication, global interconnect, direct communication of electronic systems with external optical communication network based on optical fibers or waveguides, and optical gyroscope chip. In the last case, all electronics and photonics required for sensing and signal processing could be integrated on a single chip.

Figure 1:
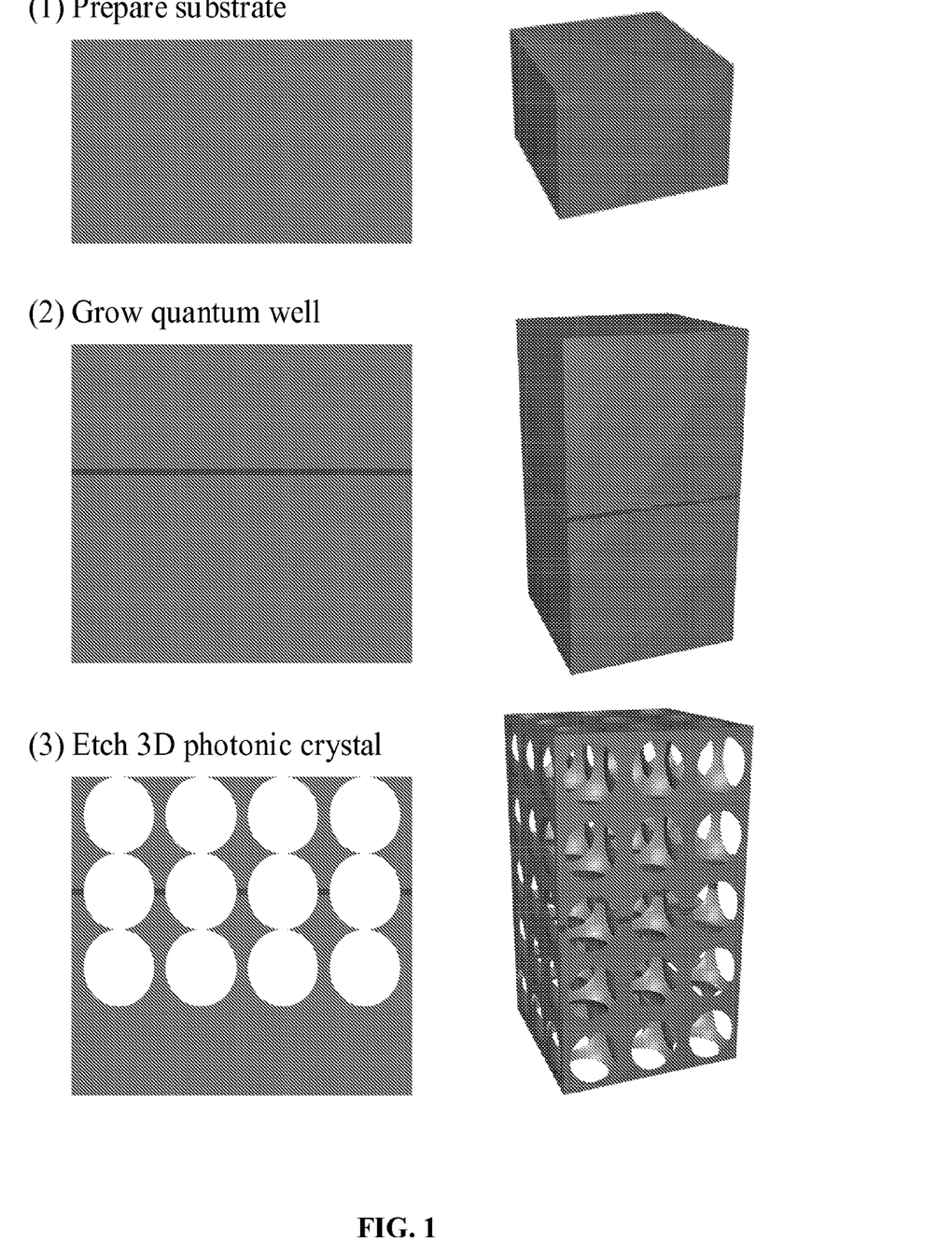
FIG. 1 illustrates an embodiment of a fabrication process for the realization of quantum dots embedded in 3D photonic crystal (PhC)

Turning now to FIG. 1, a method for fabricating a nanostructure containing quantum dots will be discussed. In step (1), the substrate is prepared, e.g., a silicon substrate, is prepared for the epitaxial growth that happens in the second step, where quantum wells are grown. The substrate may be silicon, including epitaxially grown silicon. In step (2), a quantum well is grown on a portion of the substrate, and may include germanium or silicon-germanium material, or other materials known to produce a quantum well structure and effects. In step (3), a three-dimensional (3D) photonic crystal is etched in the volume of the substrate where it intersects the quantum well layer using, for example, a modification of a known slab PhC etching techniques, such as a DRIE process, illustrated in FIGS. 5 and 7, and discussed further below.

Figure 2:
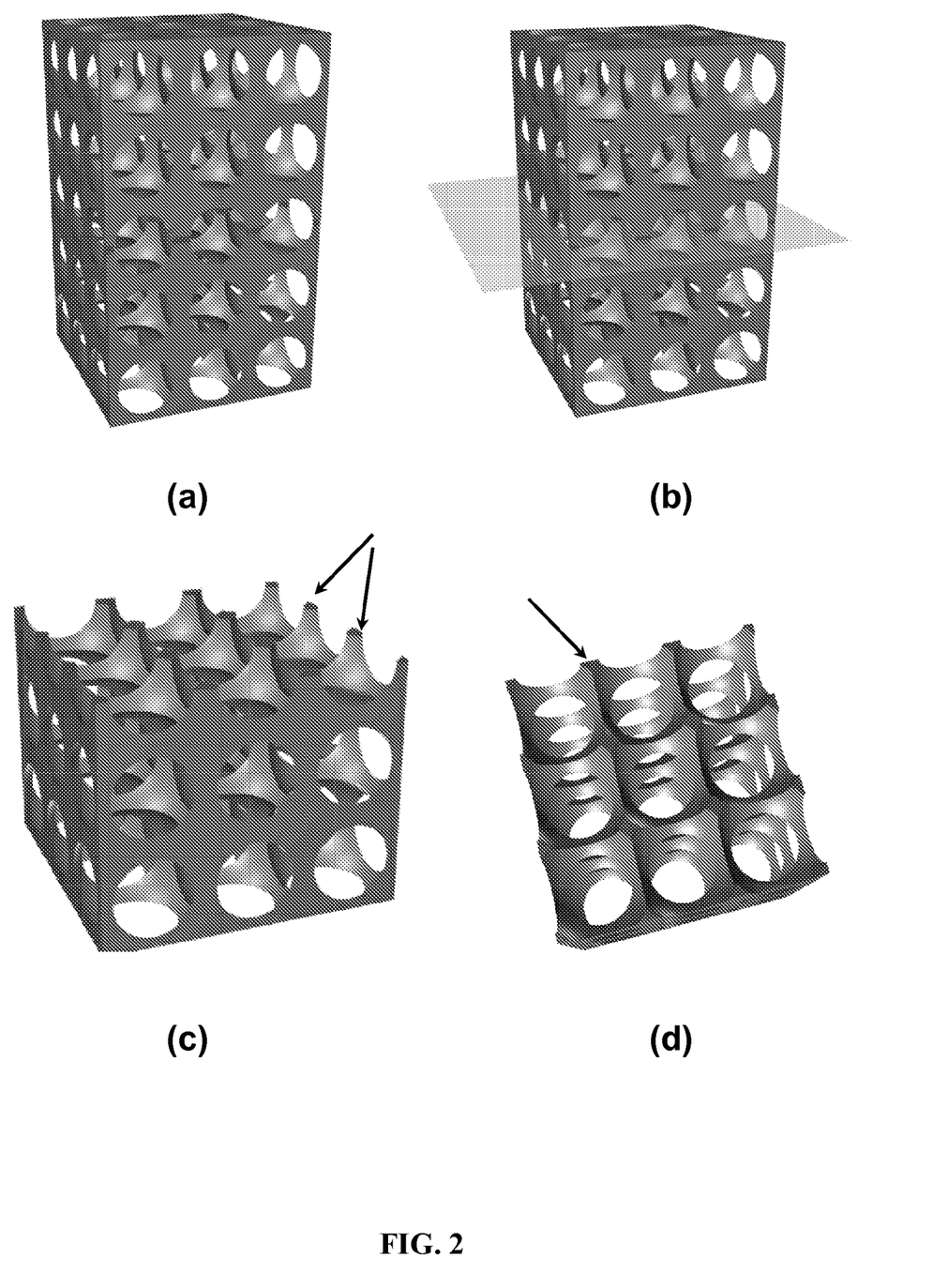
FIG. 2 provides an illustration of the emergence of quantum dots in 3D photonic crystal where

The quantum dots that form are naturally connected to the remaining silicon. Such geometry allows envisioning electrical current passing through the dots to excite optical emission, light amplification, and lasing. Quantum dots emerge at the intersection of quantum wells grown in plane, and narrow silicon veins that result from the 3D photonic crystal etch process. The emergence of quantum dots is illustrated in FIG. 2.

Figure 4:
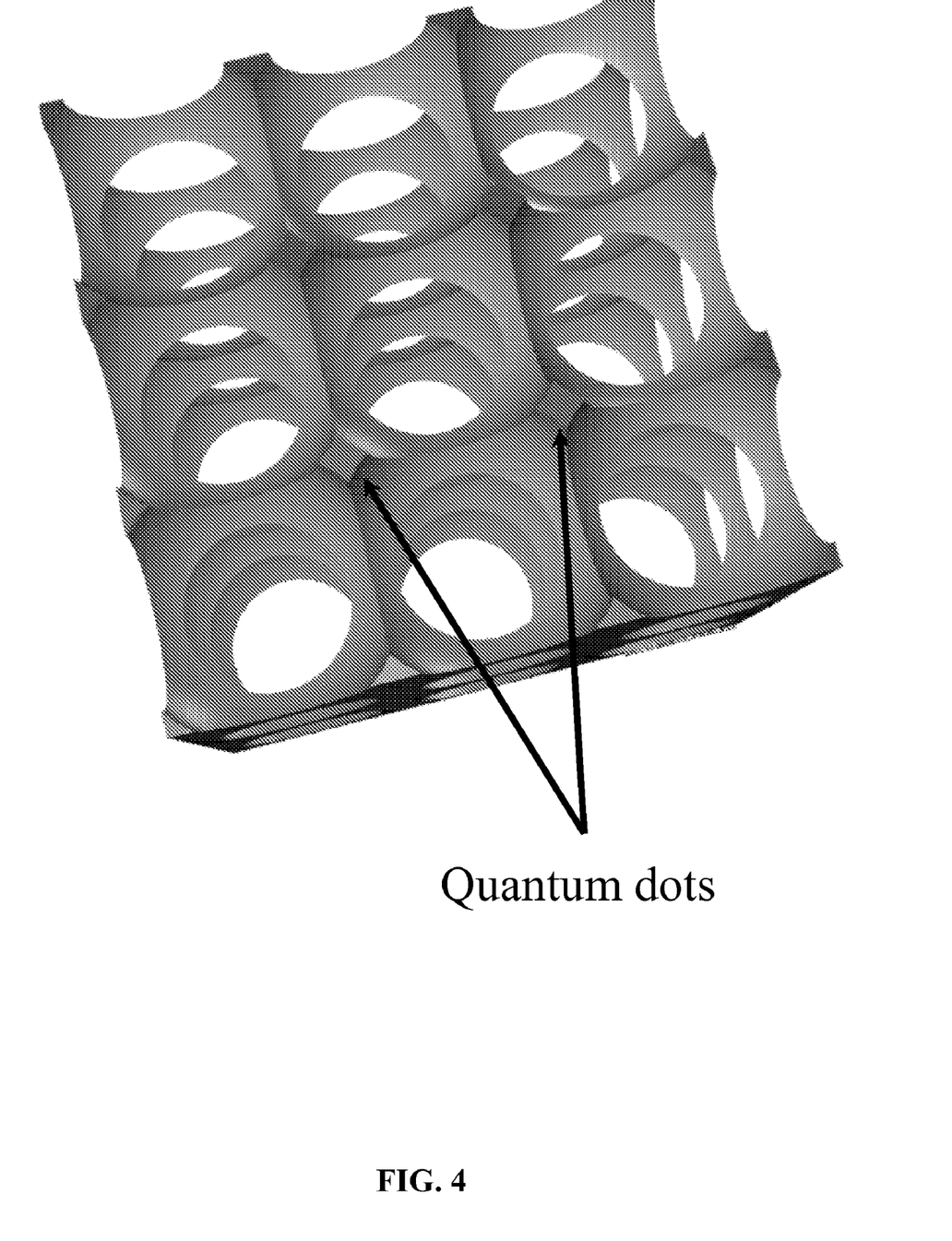
FIG. 4 provides a closer perspective view of FIG. 2(d) to illustrate the position of quantum dots in the veins between voids of the photonic crystal.

FIG. 2(a) illustrates a 3D photonic crystal etched in substrate with quantum wells. To aid in understanding, FIG. 2(b) shows a hypothetical plane by which the PhC is "split" to expose the locations and arrangement of quantum dots at the level of the hypothetical split in the PhC. FIG. 2(d) and the expanded view of FIG. 4 provide a perspective views of the quantum dots exposed in FIG. 2(c).

Figure 3:
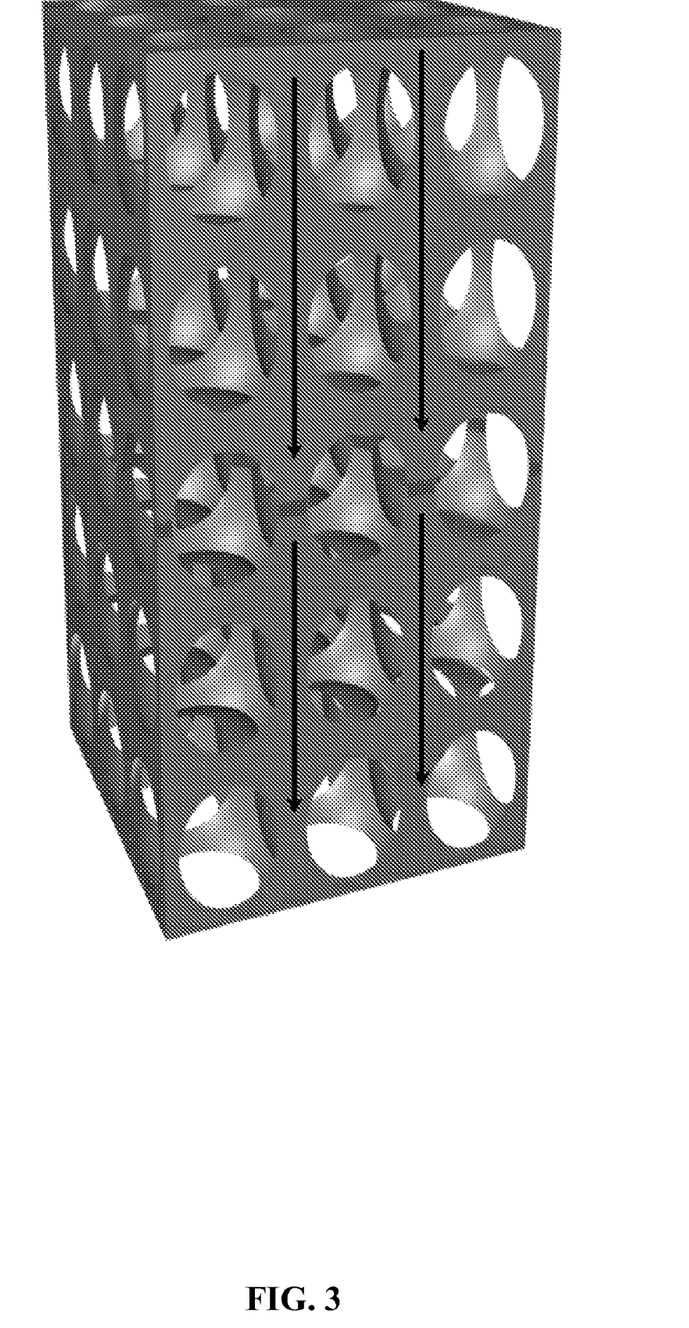
FIG. 3 provides an additional illustration of the veins, e.g., silicon veins, between voids where quantum well layers were grown and which may provide electrical connection to the quantum dots.

In FIG. 3, it may be seen that veins in the PhC (e.g., silicon veins if fabricated in bulk silicon) are connected to respective QD-s. These "veins" can be useful for providing electrical connection to the various QD-s in the device to supply, for example, injection or pumping current, or to extract a signal from the QD.

Figure 5:
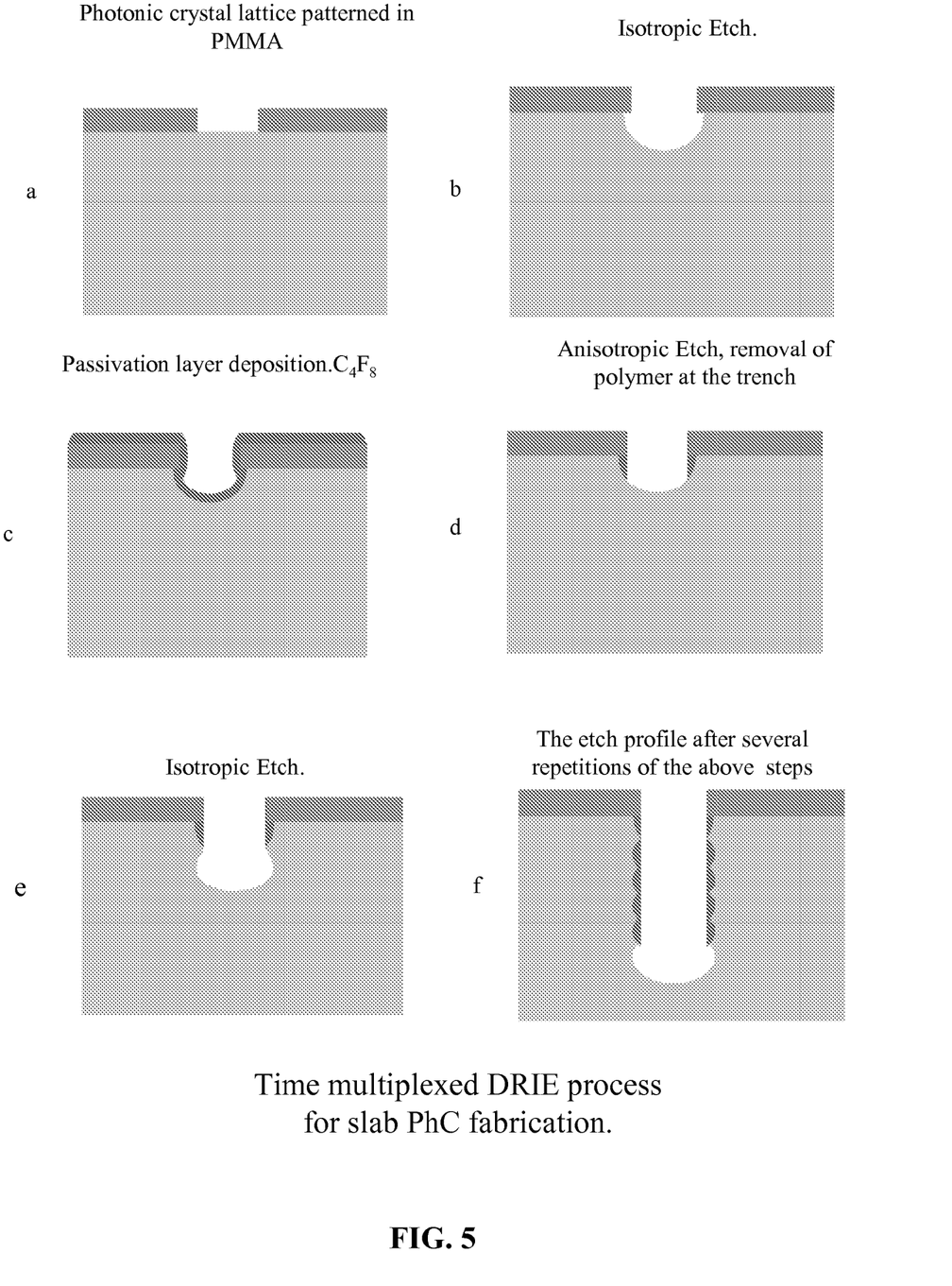
FIGS. 5(a) through 5(f) illustrate a process for Time Multiplexed Deep Reactive Ion Etch (TM-DRIE) fabrication for slab PhC fabrication, which has application in the production of photonic crystals containing quantum dots.
Figure 6:
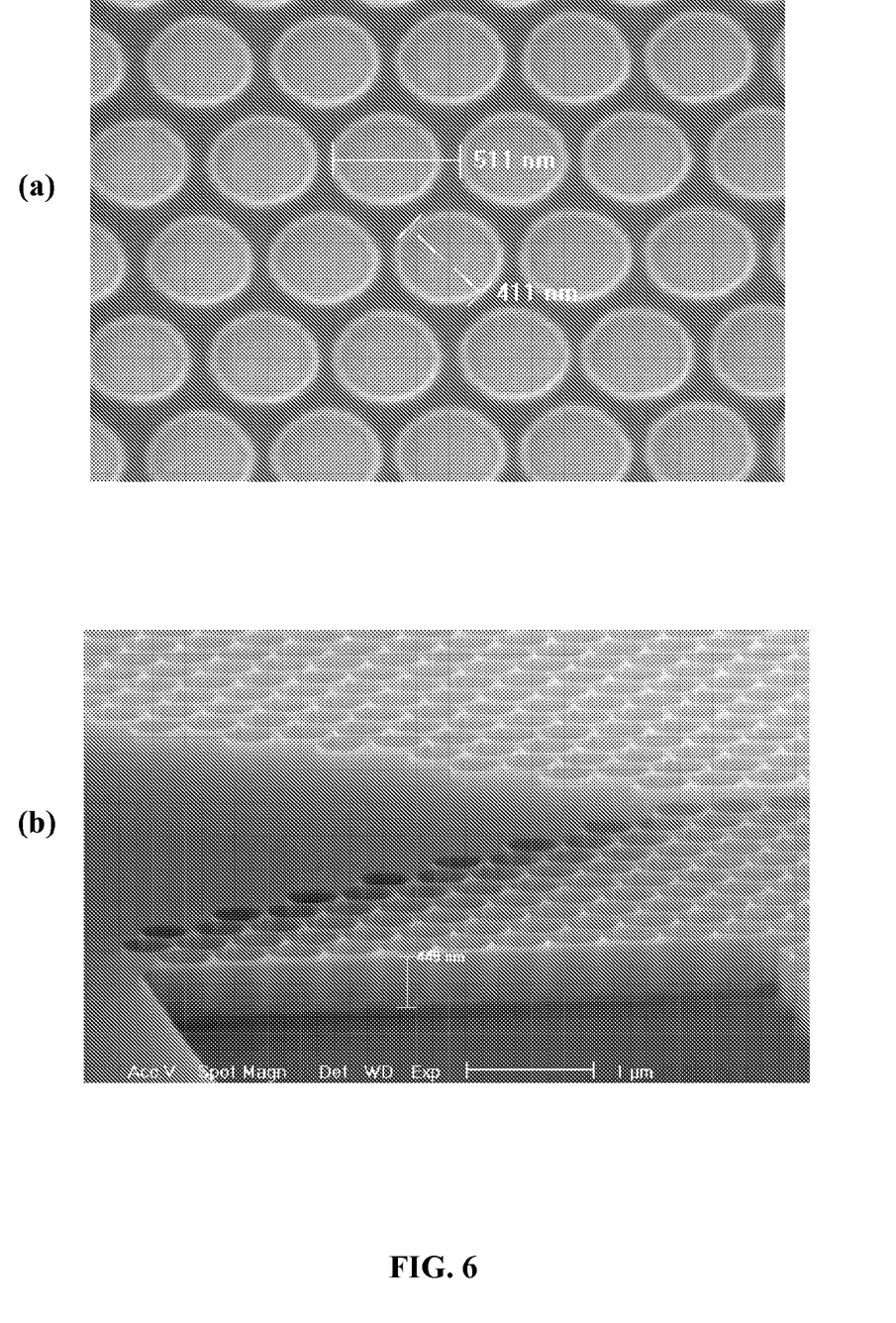

FIG. 5 illustrated a process for Time Multiplexed Deep Reactive Ion Etch (TM-DRIE) fabrication of slab PhC fabrication that may be used in conjunction with the production of photonic crystals containing quantum dots. First, a PhC crystal lattice may be patterned on the surface of a substrate, e.g., PMMA on a silicon substrate. Next, isotropic etching can be done through the pattern. In FIG. 5(c), a passivation layer may be deposited over the PMMA and area exposed by the etching. This passivation may use $C_4F_8$ or other compatible semiconductor processing materials. Then, an anisotropic etch may be used to remove polymer at the exposed trench. Next, isotropic etching may be used to deepen the trench. Further passivation, anisotropic, and isotropic etching steps may be performed to further deepen the trench, as depicted in FIG. 5(f). FIG. 6(a) and (b) provide SEM images of a PhC fabricated using the TM-DRIE technique.

Figure 7:
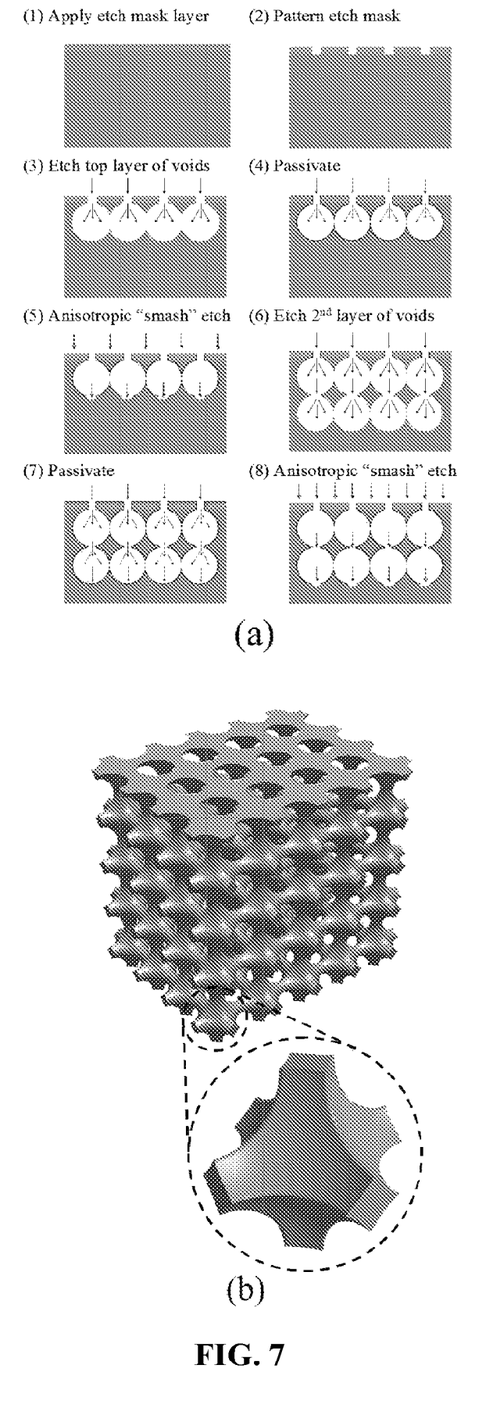
Figure 8:
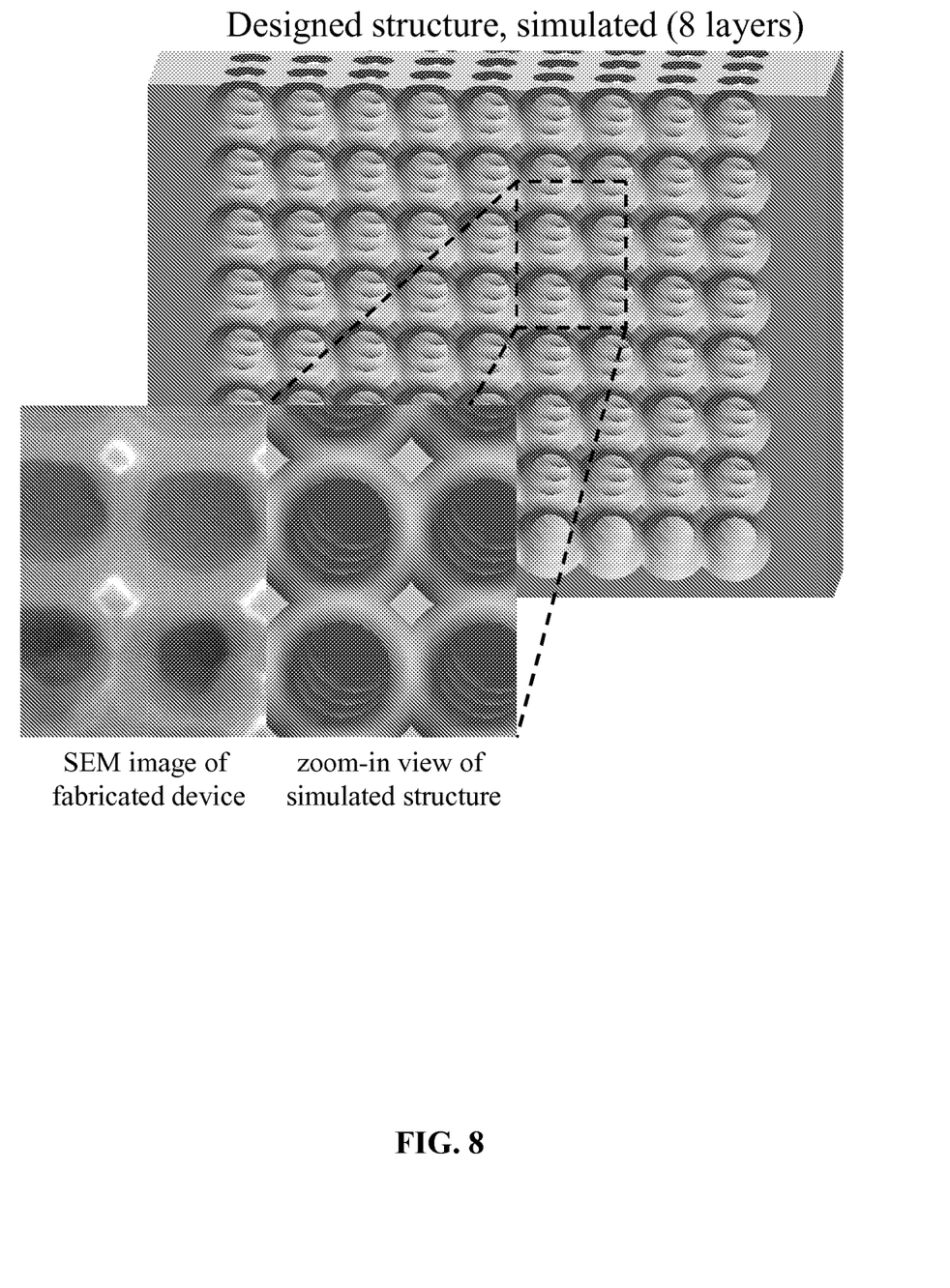
FIG. 8 illustrates a simulation of a designed structure with 8 layers, with an SEM image of a fabricated device alongside a zoom-in view of the simulated structure.

FIG. 7(a) illustrates a modified TM-DRIE process that is capable of yielding buried 3D PhCs including PhCs containing QD-s. The steps are at least somewhat similar to those in FIG. 5, but a substrate material containing one or more quantum well layers interspersed in the substrate is used. FIG. 7(b) depicts a square lattice etch mask that may be used to fabricate 3D simple cubic PhCs using conventional silicon micromachining. Finally, FIG. 8 compares an SEM image of a fabricated PhC device with the simulated 8-layer structure.

Such an approach leverages some of the benefits of layer-by-layer fabrication, such as high index contrast ($\eta_{si} \sim 3.5$ vs. $\eta_{air} \sim 1$), utilization of well established conventional CMOS mass microfabrication technologies, reproducibility, high yield, and compatibility with an optoelectronics platform. However, in contrast to existing layer-by-layer approaches, the method of FIG. 7 is simple, without the complexity, manual-labor intensiveness and long turnaround times of multi-step processes.

This process also matches some of the advantages of self-assembly and holographic approaches, namely parallelism and scalability over a wide range of electromagnetic spectrum (from UV to far IR) and, furthermore, does not require any additional processing, such as backfilling, to achieve a bandgap. This methodology follows a similar sequence to DRIE, which stimulated the growth of microelectromechanical systems (MEMS).

One area deserving mention in the above method is the required accuracy of (surface) lithography and the etching process necessary to arrive at QD-s of desired size. Having openings in the etch mask few tens of nanometers too wide would obliterate the QD, while too narrow an opening would produce QD-s too large to be useful light emitters. Similar constraints are placed on the etch process. While these are potential difficulties, both current generation lithography and etching processes can be controlled to a very high degree so as to achieve the necessary tolerances, with further improvements in these techniques being made over time.

The method and structure of this disclosure has applicability to a wide variety of semiconductor devices, including nanostructure sensors and light sources, including laser light sources. There are numerous inventions related to the generation of light with the use of quantum dots. While both quantum dots and photonic crystals are known, per se, to the best of the present inventors' knowledge, this disclosure provides the only process that allows for the fabrication of quantum dots embedded in 3D photonic crystal, and in a silicon-based material using conventional semiconductor processing techniques.

What is claimed as new and desired to be protected by Letters Patent of the United States is:

1. A process for producing an optoelectronic nanostructure, comprising:
   a photonic crystal intersecting at least one quantum well, the photonic crystal defined by a plurality of voids and a plurality of veins;
   a plurality of quantum dots, each of one or more of said plurality of quantum dots comprising an intersection of at least one of said veins with said at least one quantum well and located between a multiplicity of said plurality of voids; and
   an electrical connection to one or more of the plurality of quantum dots through an associated vein,
   the process comprising the steps of:
   preparing a substrate;
   providing a quantum well layer on the substrate;
   etching a volume of the substrate to produce the photonic crystal comprising said plurality of quantum dots, wherein said plurality of quantum dots are located at a plurality of intersections of the quantum well layer within the photonic crystal.

2. The process of claim 1, further comprising placing an electrode on a surface of the photonic crystal and providing the electrical connection between the electrode and the at least one of the plurality of quantum dots.

3. The process of claim 1, further comprising:
   providing a plurality of quantum well layers within the volume of the substrate; and etching the volume of the substrate to produce a plurality of vertically aligned quantum dots.

4. The process of claim 1, wherein the step of providing the quantum well layer on the substrate comprises epitaxially growing the quantum well layer.

5. The process of claim 1, wherein the step of providing the quantum well layer on the substrate comprises providing a material comprising germanium.

6. The process of claim 1, wherein the step of etching the volume of the substrate to produce the photonic crystal comprises isolating the plurality of quantum dots into a plurality of groups of quantum dots.

7. The process of claim 1, wherein the step of etching the volume of the substrate to produce the photonic crystal comprises producing a single quantum dot at one or more of the plurality of intersections of the quantum well layer within the photonic crystal.

8. The process of claim 1, further comprising forming a passivation layer on an inside surface of the photonic crystal.

9. The process of claim 1, further comprising a step of providing a dopant on an inside surface of the photonic crystal.

10. The process of claim 9, wherein the step of providing a dopant comprises doping a passivation layer with a rare earth material.

11. The process of claim 1, wherein the electrical connection to the at least one of the plurality of quantum dots comprises a silicon vein.

12. A method of producing a laser light from an optoelectronic nanostructure, comprising:
    a photonic crystal intersecting at least one quantum well, the photonic crystal defined by a plurality of voids and a plurality of veins;
    a plurality of quantum dots, each of one or more of said plurality of quantum dots comprising an intersection of at least one of said veins with said at least one quantum well and located between a multiplicity of said plurality of voids; and
    an electrical connection to one or more of the plurality of quantum dots through an associated vein,
    the method comprising:
    injecting current into one or more of the plurality of quantum dots;
    forming an exciton in response to the injection current;
    pumping atoms of a dopant in the photonic crystal by a decay of the exciton;
    yielding a population inversion sufficient to produce the laser light; and
    extracting photons from the photonic crystal.

13. The process of claim 1, further comprising lithographically defining the multiple quantum dots.

14. The method of claim 12, further comprising providing an injection current to at least one of the plurality of quantum dots through the electrical connection, wherein the injection current is unable to bypass the at least one of the plurality of quantum dots.

15. The method of claim 12, wherein the dopant comprises a rare earth material.

16. The method of claim 12, wherein the multiple quantum dots comprise germanium.

17. An optoelectronic nanostructure, comprising:
    a photonic crystal intersecting at least one quantum well, the photonic crystal defined by a plurality of voids and a plurality of veins;

a plurality of quantum dots, each of one or more of said plurality of quantum dots comprising an intersection of at least one of said veins with said at least one quantum well and located between a multiplicity of said plurality of voids; and an electrical connection to one or more of the plurality of quantum dots through an associated vein.

18. The nanostructure of claim 17, wherein said plurality of quantum dots comprise silicon.

19. The nanostructure of claim 17, wherein said plurality of quantum dots comprise germanium.

20. The nanostructure of claim 17, wherein said interconnecting veins comprise silicon.

21. The nanostructure of claim 17, further comprising a passivation layer arranged on an interior surface of the photonic crystal.

22. The nanostructure of claim 17, further comprising a dopant in a layer arranged on an interior surface of the photonic crystal.

23. The nanostructure of claim 22, wherein the dopant is responsive to an injection current provided through one of the interconnecting veins to at least one of the multiple quantum dots, by being pumped sufficiently to support a population inversion that supports a laser emission.

24. The nanostructure of claim 22, wherein said dopant comprises erbium.

25. The nanostructure of claim 17, further comprising a passivation layer arranged on an interior surface of the photonic crystal, wherein the passivation layer comprises $SiO_2$ doped with erbium.

26. A method for producing an optoelectronic nanostructure, comprising:

a photonic crystal intersecting at least one quantum well, the photonic crystal defined by a plurality of voids and a plurality of veins;

a plurality of quantum dots, each of one or more of said plurality of quantum dots comprising an intersection of at least one of said veins with said at least one quantum well and located between a multiplicity of said plurality of voids; and an electrical connection to one or more of the plurality of quantum dots through an associated vein, the method comprising:

providing a substrate with at least one quantum well layer; and etching a volume of said substrate to produce said voids and said interconnected veins in the photonic crystal, wherein the plurality of quantum dots are produced at intersections of said at least one quantum well layer with said interconnected veins.

* * * * *